(12) United States Patent
Volker

(10) Patent No.: US 9,162,187 B2
(45) Date of Patent: Oct. 20, 2015

(54) FILTER MODULE AND THE STRINGING THEREOF TO FORM A FILTER SYSTEM

(76) Inventor: Manfred Volker, Blankenbach (DE)

(*) Notice: Subject to any disclaimer, the term of this patent is extended or adjusted under 35 U.S.C. 154(b) by 841 days.

(21) Appl. No.: 12/679,094

(22) PCT Filed: Jul. 24, 2008

(86) PCT No.: PCT/DE2008/001272
§ 371 (c)(1),
(2), (4) Date: Mar. 19, 2010

(87) PCT Pub. No.: WO2009/036717
PCT Pub. Date: Mar. 26, 2009

(65) Prior Publication Data
US 2010/0307965 A1    Dec. 9, 2010

(30) Foreign Application Priority Data
Sep. 20, 2007    (DE) .......................... 10 2007 044 922

(51) Int. Cl.
| | | |
|---|---|---|
| *B01D 35/30* | (2006.01) | |
| *B01D 61/08* | (2006.01) | |
| *B01D 63/00* | (2006.01) | |
| *B01D 65/00* | (2006.01) | |
| *B01D 61/02* | (2006.01) | |

(52) U.S. Cl.
CPC .............. *B01D 65/00* (2013.01); *B01D 61/025* (2013.01); *B01D 61/08* (2013.01); *B01D 63/00* (2013.01); *B01D 2313/02* (2013.01); *B01D 2313/04* (2013.01); *B01D 2313/10* (2013.01); *B01D 2313/105* (2013.01); *B01D 2313/12* (2013.01); *B01D 2313/125* (2013.01); *B01D 2313/21* (2013.01); *B01D 2313/44* (2013.01); *B01D 2315/10* (2013.01)

(58) Field of Classification Search
CPC ........ B01D 29/26; B01D 29/21; B01D 29/15; B01D 29/114; B01D 29/58; B01D 29/908; B01D 29/01; B01D 29/33; B01D 29/0022
USPC ........ 210/321.6, 136, 321.87, 232, 258, 259, 210/251, 432, 257.2, 321.72, 117, 253, 252, 210/321.89, 321.79, 444, 445
See application file for complete search history.

(56) References Cited

U.S. PATENT DOCUMENTS 5,128,035 A * 7/1992 Clack et al. .................. 210/251
5,221,473 A * 6/1993 Burrows ...................... 210/232

(Continued)

FOREIGN PATENT DOCUMENTS

| DE | 3943631 C2 | 12/1990 |
| WO | 03106003 | 12/2003 |

*Primary Examiner* — David C Mellon
*Assistant Examiner* — Pranav Patel
(74) *Attorney, Agent, or Firm* — Greer, Burns & Crain, Ltd.

(57) ABSTRACT

A filter module comprising a pressure pipe and a membrane disposed therein, having connections for a fluid to be fed, preferably untreated water, and for filtrate and retentate to be discharged, characterized by a functional/connection unit which is fastened in one end of the pressure pipe and has an upper part and a lower part, wherein all of the connections are provided on the upper part, and flow ducts which are in communication with the connections pass through the lower part, wherein the pressure pipe and the membrane have provided thereinbetween an open annular space through which the fed fluid flows to the bottom side of the membrane, and wherein the pressure pipe has a closed bottom.

22 Claims, 8 Drawing Sheets

(56) References Cited

U.S. PATENT DOCUMENTS

| | | | |
|---|---|---|---|
| 5,405,528 A * | 4/1995 | Selbie et al. | 210/232 |
| 5,865,996 A * | 2/1999 | Reid | 210/232 |
| 2003/0173286 A1* | 9/2003 | Evanovich et al. | 210/435 |
| 2004/0104157 A1* | 6/2004 | Beeman et al. | 210/232 |
| 2004/0104161 A1* | 6/2004 | Gaignet et al. | 210/323.2 |
| 2004/0251192 A1* | 12/2004 | Fritze et al. | 210/321.6 |
| 2005/0173317 A1* | 8/2005 | Schmitt | 210/109 |
| 2006/0213821 A1* | 9/2006 | Choi et al. | 210/136 |

* cited by examiner

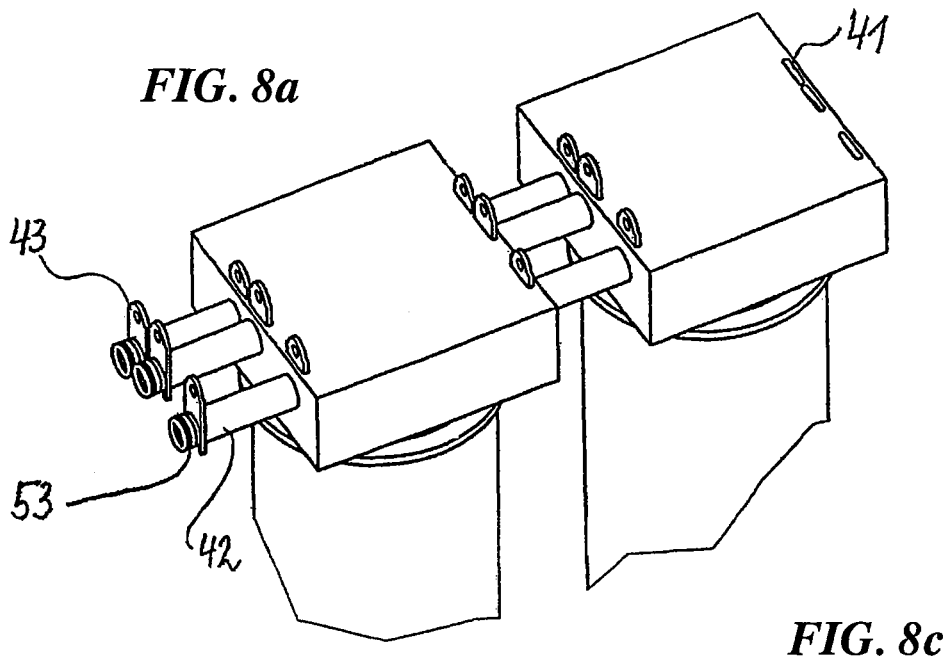
FIG. 8a
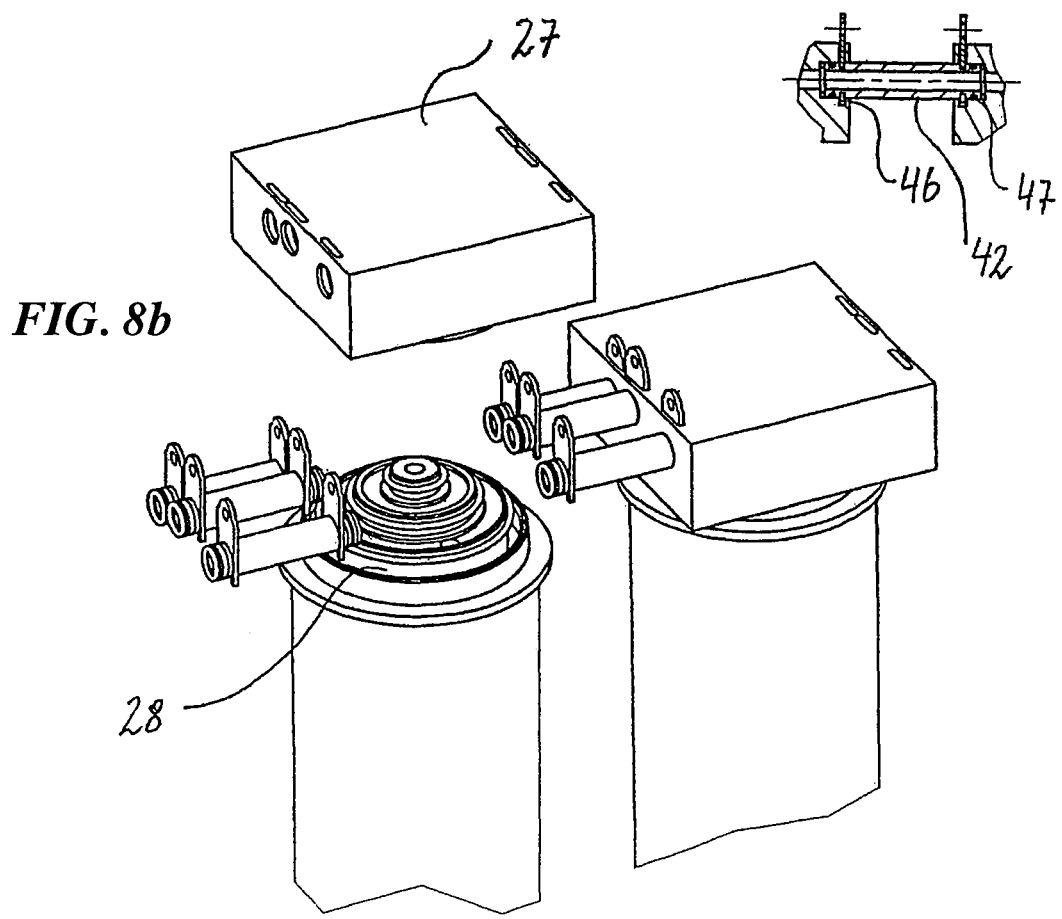
FIG. 8c
FIG. 8b

FILTER MODULE AND THE STRINGING THEREOF TO FORM A FILTER SYSTEM

CROSS REFERENCE

This application is a U.S. National Phase under 35 U.S.C. §371 of International Application No. PCT/DE2008/001272, filed Jul. 24, 2008, which claims priority from German Patent Application No. 10 2007 044 922.6, filed Sep. 20, 2007.

FIELD OF THE INVENTION

The present invention relates to a filter module and to the stringing thereof to form a filter system. The system was conceived and developed to be used in the water treatment sector, specifically as a component of a reverse osmosis system. However, it can easily be used with other applications, e.g. gas filtration.

An essential aspect of the invention is that said filter module, composed of a filter—also called membrane, a pressure pipe and a functional/connection unit, is configured as a quick-change filter and shows a water conduction without any dead spaces. The special configuration of the filter module provides for a closure technique for the one-sided connection to a functional/connection unit. A further feature is the stringing of several filter modules to form a filter system. It is here of special importance that the feed and discharge connections on the filter module are always provided at one side, i.e. on the functional/connection unit.

BACKGROUND

Reverse osmosis systems particularly serve to recover pure sterile water from tap water, e.g. for medical, pharmaceutical and food-technological applications.

As is known, its functional principle consists in that the water to be treated is passed in a filter module under pressure along the surface of a semipermeable membrane, wherein part of the water, the so-called permeate, passes through the membrane and is collected at the other side of the membrane as ultrapure water and supplied to the point of consumption.

The part of untreated water that does not pass through the membrane and is enriched with retained substances, the so-called concentrate, flows out of the membrane module at the end of the flow path of the primary chamber.

Ideally, the ultrapure water obtained thereby is sterile due to the retention characteristics of the membrane and free of organic decomposition products. In reality, however, this is just not the case. Without special counter-measures there may be an infestation of the permeate system with microorganisms. A so-called biofilm is formed on the inner surfaces of the liquid conducting system. Said biofilm is also called fouling.

Fouling stands for the loss in permeate capacity due to deposition of secondary layers on the membrane surface. This may be organic material, colloidal substances, or inorganic salts that exceed the precipitation limits upon concentration.

Up to the present day there has been no generally applicable recipe for preventing fouling. "Low fouling membranes" and an improved pretreatment as well as better membrane cleaning techniques just represent inadequate technical possibilities of controlling fouling.

In industry, temperature-resistant polymer membranes for reverse osmoses are for instance available; these are disinfected with water at 90°. First of all, said measure only serves to reduce the number of germs, but is of little help for removing the biofilm.

Another possibility consists in carrying out disinfection or purification in reverse osmosis systems at suitable time intervals. To this end the normal operation is interrupted and a chemical disinfecting or cleaning agent is supplied to the liquid conducting system. Following an appropriate exposure time a flushing operation is performed, which serves to remove the introduced disinfecting or cleaning agent and its reaction products again, so that the normal supply operation can then be resumed again.

On account of the great risks associated with an uncontrolled supply and with the residues of disinfecting or cleaning agents, such operation normally calls for the employment of technical stuff, especially in the case of medical applications (hemodialysis), and is thus cost-intensive.

Further disadvantages of the former solutions are the high energy input during thermal disinfection and the loss in permeate output due to the unremovable biofilm.

Since the loss in permeate output or a contamination with germs can even not be compensated by complicated cleaning and disinfecting measures in many cases, the membranes are exchanged.

Such a membrane exchange is carried out in today's devices by a technician in such a way that first of all the whole reverse osmosis system is stopped and the tripartite filter module, made up of membrane element, pressure pipe and connection unit, is disassembled by means of a tool. A conventional construction is shown in FIG. 1.

Thereupon, the water-wetted membrane element is pulled out of the pressure pipe and replaced by a new one. Depending on the size of the system, several membrane elements are concerned.

Several liters of water, also contaminated one, may here exit per membrane element.

The standstill times of the reverse osmosis system caused during repair work may here also be considerably long and very disadvantageous for patients, particularly in the sector of organ-supporting devices (hemodialysis).

A further drawback is the chemical disinfection following the exchange, which is needed for the reason that during repair even the ultrapure components of the connection pipes or components were contaminated by the technical stuff and by tools.

Of considerable disadvantage is the tripartite structure of membrane, pressure pipe and connection unit of the existing filter module; this tripartite structure has a historical background and is due to the originally high transmembrane pressures of the membranes. Therefore, filter modules have been devised with a high pressure resistance of pressure pipe and connection unit.

95% of all RO membranes are nowadays crosslinked aromatic diamines (-polyimide-).

This aromatic polyamide is applied in an extremely thin layer (<0.3 micrometers) to a carrier membrane (or support layer). The membrane is therefore also called thin-film membrane.

Since the membrane layers are getting thinner and thinner at the same permeate output, this results in a transmembrane pressure that is getting smaller and smaller. The existing pressure pipe designs exploit this innovation from an economic viewpoint only inadequately.

Especially in the sector for medical and food-technological applications, attention is paid that there is no dead space in the filter module. To this end so-called "full fit" membranes without any dead space are offered by the industry. These membranes are expensive. An additional drawback is the necessary additional pump capacity that is needed for overflowing the pipe gap between the membrane element and the pressure pipe.

Another drawback of this technology is the fact that the liquid feeding and discharging connections on the filter module are made two-sided on both ends of the filter module.

Other drawbacks of the former solution are that the components for measuring state variables, throughputs, or substance characteristics are not centrally arranged between the pipelines. These components are e.g. conductivity or pH measuring cells and devices for changing the liquid streams, for instance valves or throttles.

The enormous piping and tubing efforts needed for stringing the filter modules so as to obtain a single-filter system must be evaluated in the same way.

SUMMARY OF THE INVENTION

For the reasons given above it is therefore the object of the present invention to provide a membrane module which avoids at least some of the drawbacks of the prior art with respect to hygiene, exchangeability, manufacturing costs.

This object is achieved according to the invention by a filter module comprising a pressure pipe and a membrane disposed therein, having connections for a fluid to be fed, preferably untreated water, and for filtrate and retentate to be discharged, characterized by a functional/connection unit which is fastened to one end of the pressure pipe and has an upper part and a lower part. All connections are provided on the upper part. Flow ducts in communication with the connections pass through the lower part. The pressure pipe and the membrane have provided thereinbetween an open annular space through which the fed fluid flows to the bottom side of the membrane, and the pressure pipe has a closed bottom. Advantageous developments of the invention are described below.

Further features and advantages of the present invention become apparent from the following description of embodiments.

BRIEF DESCRIPTION OF THE DRAWINGS

The accompanying figures show in

FIG. 1
A standard RO system with a tripartite filter module according to the prior art FIG. 2
An RO system according to the invention FIG. 3
A scheme of a filter module according to the invention FIGS. 3a and 3b
A plurality of filter modules in serial and parallel connection FIG. 4
A functional/connection unit for a filter system in a perspective schematized illustration FIG. 5a/b
A vertical section and associated perspective illustration of the functional/connection unit shown in FIG. 4, with membrane and screwed-on modular pipe FIG. 5c
A detail at a larger scale of the functional/connection unit taken where indicated in FIG. 5a.

FIG. 6a/b
A vertical section through a functional/connection unit with membrane and flanged modular pipe FIG. 6c
A detail at a larger scale of the functional/connection unit taken where indicated in FIG. 6a.

FIG. 7a/b
A vertical section through a functional/connection unit for a filter system with screwable upper/lower part and undetachable modular pipe FIG. 7c
A filter system of the functional/connection unit shown in FIG. 7a/b in a perspective schematized illustration FIGS. 7d/e
Details at a larger scale of the functional/connection unit taken where indicated in FIG. 7a.

FIGS. 8a/b/c
A schematic illustration of FIG. 7c between neighboring functional/connection units with the sealing elements to be inserted and with the associated locking.

DETAILED DESCRIPTION OF PREFERRED EMBODIMENT

FIG. 1

Figure 1:
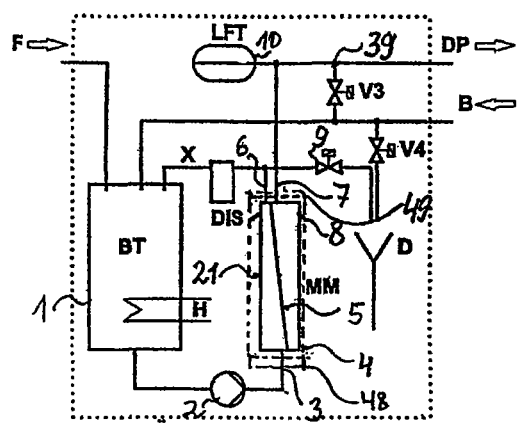
Figure 2:
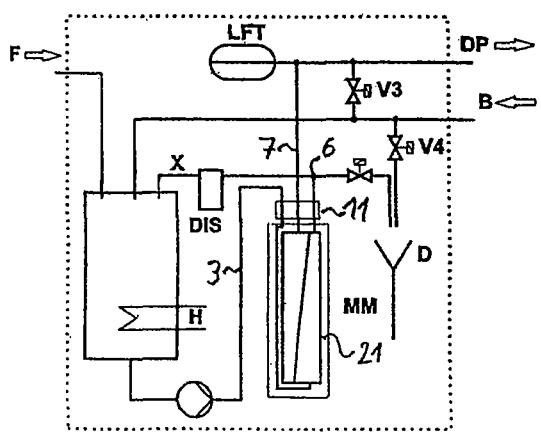

The supplied liquid flows from the feed container (1) via the high-pressure pump (2) and the connection of the liquid supply (3), which is fastened to the lid of the pressure pipe (48), via the pressure pipe (4) into the membrane (5). Liquid does here not flow through the annular gap between membrane and pressure pipe inside (21) because of the sealing lip of the membrane (8). In the absence of sealing lips, part of the supplied liquid would lead to an inadequate membrane overflow because of the bypass then formed to the membrane. The missing overflow would then have to be compensated by an increased pump capacity. The ultrapure water flows to the outlet DP via the filtrate connection (7), which is fastened to the lid (49). In case of a faulty permeate conductivity, detected by conductivity measurement (10), the release valve (39) is opened and ultrapure water flows back to the feed container (1). To control the yield and the ultrapure quality, the reject valve (9) is periodically switched.

In this case the modular pipe (4) is equipped with two lids (48, 49) in which on the one hand the connection liquid supply (3) and on the other hand the connections for retentate and filtrate (6 and 7) are fastened. For disassembly the lids (48/49) must be opened. Before this the connections (3/6/7), which are mostly designed as high pressure-resistant connections, must be disengaged. It is only then that the membrane can be removed. On account of the many sealing points, frequent leakages often result from repair work.

FIG. 2

In comparison with FIG. 1, this figure shows the scheme of the functional/connection unit (11) according to the invention. As can be seen, all of the three connections (3/7/6) are supplied at one side, i.e. at one end of the modular pipe, and the annular gap between membrane and pressure pipe inside (21) is flushed.

FIG. 3a/b

This figure illustrates the scheme and shows, in particular, the possibility of a modular serial and parallel connection for increasing the filtrate capacity. This increase can be achieved by stringing and connecting the functional/connection unit (11). High-pressure connections are here not needed; likewise, the membrane exchange can be carried out without any disconnecting of the lines. By means of connection nipple 42, which is here used as an undrilled nipple, the connections that are not needed are here closed or not established, respectively. The advantage lies here in the uniform design of the functional/connection units 11. The illustrated flow conduction is only possible if the connections 3 and 6 are arranged in symmetry with the connection 7 and are there positioned horizontally also on a line so that in the case of a serial connection the subsequent functional/connection unit can be rotated by 180°. If the connections 3 and 6 are not in symmetry with the connection 7 and if they are not positioned along a line, a reversal of the flow direction within the filter module respectively takes place in case of stringing. For degassing the filter module the illustrated flow direction is advantageous, but is not imperative, so that in response to the constructional advantage the functional/connection unit 11 can be configured with symmetrical or unsymmetrical connections 3, 6, 7.

The functional/connection unit can be mounted on the upper or on the lower end of the pressure pipe.

FIG. 4

This figure shows the detailed functional/connection unit (11). Said figure shall illustrate, on the one hand, the stringing concept by means of the prismatic upper part and the ease of exchangeability of the membranes by means of screw threads for the modular pipe. Further details shall be given hereinafter:

Reference numeral (12) denotes the prismatic upper part and reference numeral (16) the cylindrical lower part. In this case the cylindrical lower part is provided with the connection thread (19) for accommodating the pressure pipe (4). The permeate collection pipe of the membrane (5) is inserted into the accommodating bore of the permeate collection pipe (15) and the upper part of the membrane is here sealed with seal (8), said seal being also mountable on the membrane. The complete function shall be depicted in FIGS. 5a-c.

The liquid ducts (50) and the webs (51) serve the uniform distribution of the liquid supply into the annular gap between membrane and pressure pipe inside.

The membrane stop (52) provides for an unhindered discharge of the retentate into the bore (14).

The prismatic upper part may additionally contain accommodating connections for measurement and control tasks. The geometry is particularly expedient for the space-saving stringing of a number of units.

The filtrate connection 7 is normally arranged in the center all the time. The connections 3, 6 are advantageously in symmetry with 7 and are positioned on a joint horizontal plane relative to one another. It is thereby possible to rotate the functional/connection unit 11 in a filter system by 180° each time and thereby to string it together such that there will be no directional change in the flow within the filter modules. However, it may also be expedient under constructional aspects to depart from this symmetry to achieve flow changes within the filter module.

Figure 4:
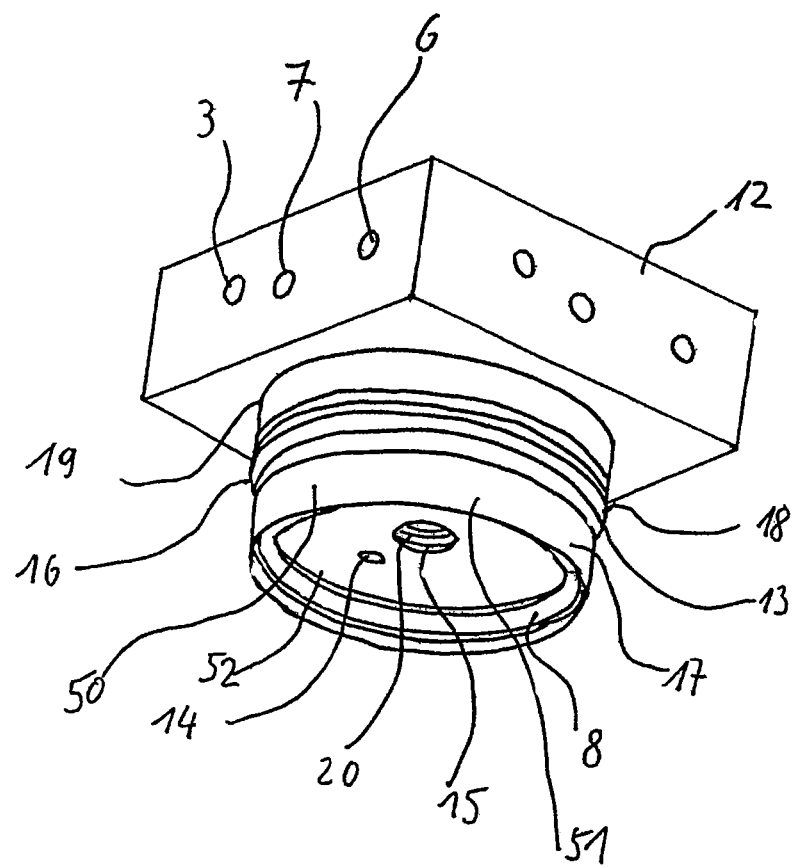

Deviating from the illustration of FIG. 4, it is also possible that the two connections 3 and 7 are provided in at least one side face of the prism, whereas connections 6 and 7 are provided in another side face, so that two or more functional/connection units 11 are interconnectable to form a filter system, with the side faces thereof being positioned in parallel with each other.

Figure 5A:
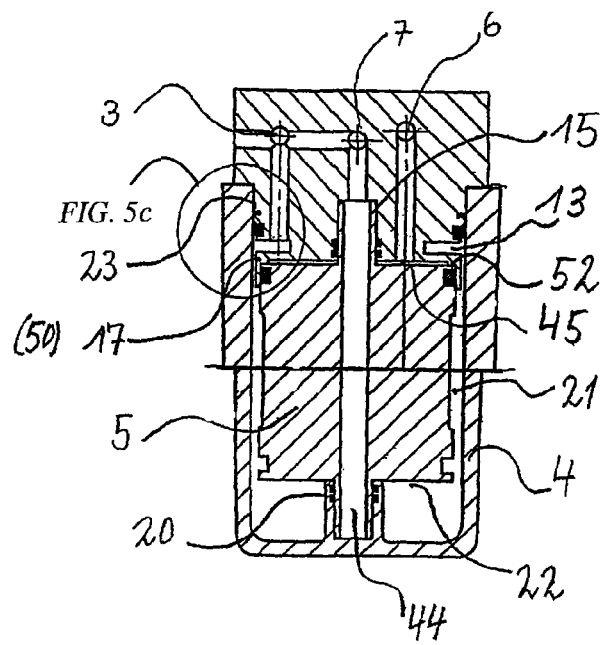
Figure 5C:
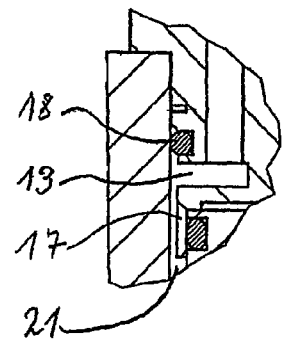
Figure 5B:
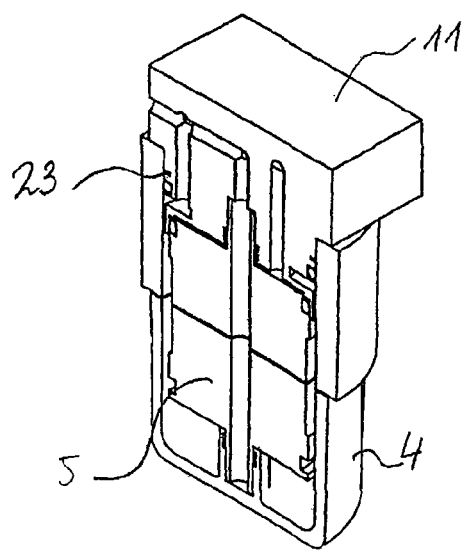

FIGS. 5a-c

This figure shall illustrate the function with respect to the absence of dead space and ease of exchangeability of the membrane. This construction is preferred in the case of exchangeable membranes with plastic pressure pipes.

The liquid supply is carried out on connection (3). The liquid, or also the gas, flows via the outlet bore with surrounding annular gap (13) externally on the accommodating cylinder (17) of the membrane into the liquid ducts (50) on the outside of the cylinder in a uniformly distributed manner into the annular gap (21).

The liquid supply into the membrane takes place via the front face (22). The filtrate is here filtered to the permeate collection pipe (44) and leaves the functional/connection unit (11) via the filtrate connection (7). The retentate exits on the front side at (45). The retentate leaves the functional/connection unit via the retentate connection (6).

For enabling the liquid to exit (45) on the whole front face, the accommodating cylinder of the membrane (17) is provided on its inside with a stop (52) on which the membrane is supported on the peripheral rim.

The special design provides for a screwed-on pressure pipe (4) which is fastened by means of internal thread (23) to the functional/connection unit.

The modular pipe is sealed by means of sealing element (18).

As a force-fit reinforcement of the screw coupling, a pipe sleeve may be pressed via the outside of the modular pipe (not shown) into the threaded portion.

Figure 6A:
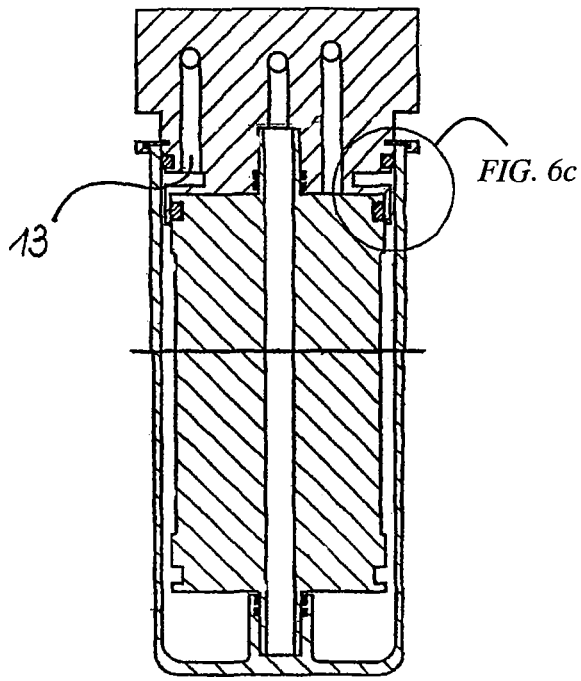
Figure 6C:
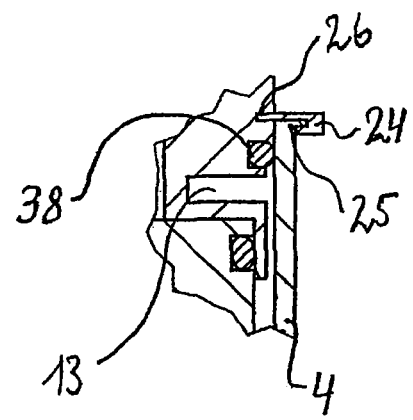
Figure 6B:
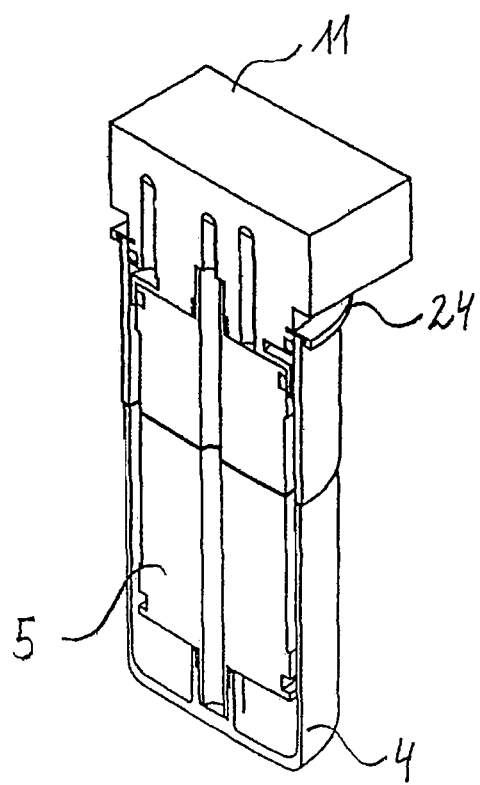
Figure 7A:
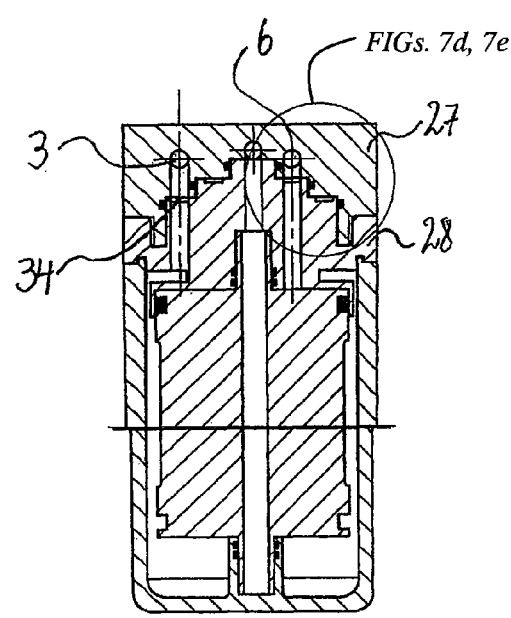
Figure 7D:
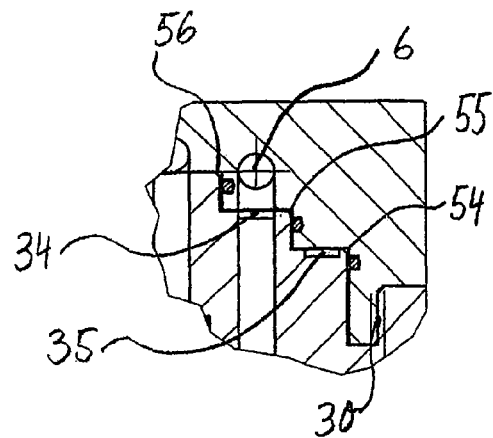
Figure 7B:
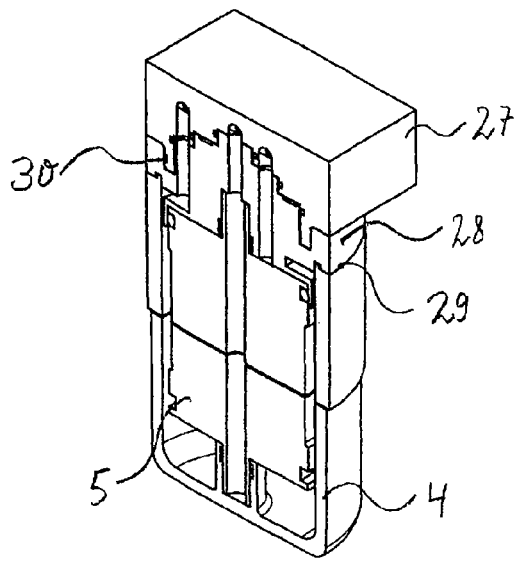
Figure 7E:
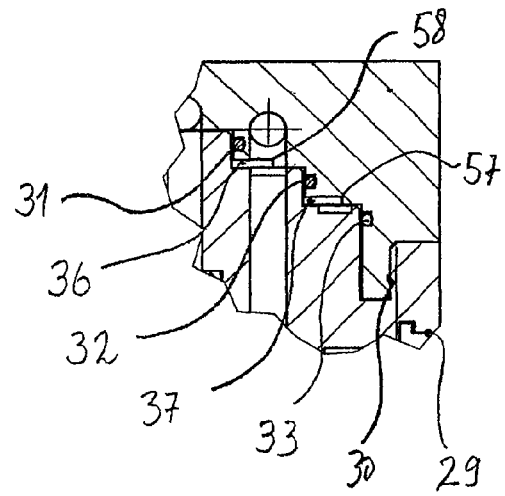
Figure 7C:
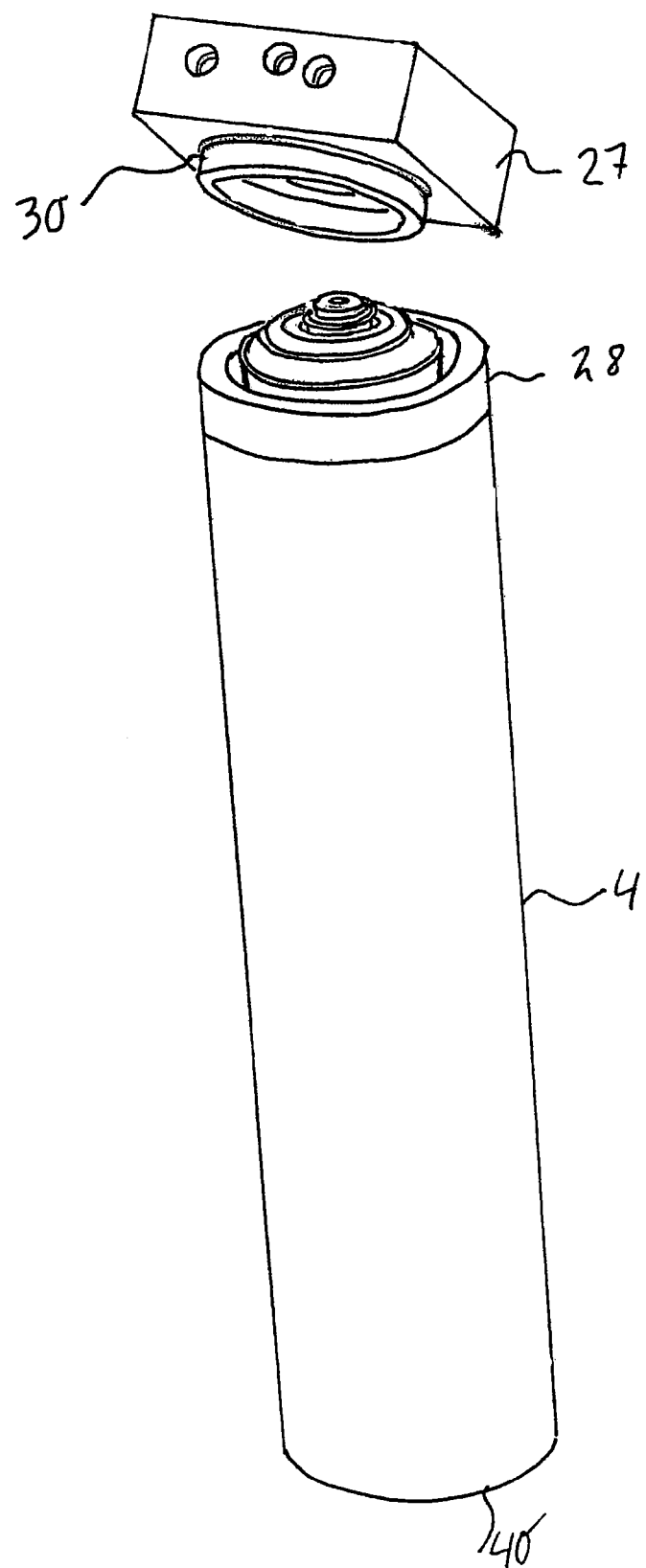

FIGS. 6a-c

This figure is to illustrate the function with respect to the absence of dead space and the ease of exchangeability of the membrane in the use of metallic pressure pipes.

With very thin-walled, e.g. metallic, pressure pipes a threaded fastening as depicted in FIG. 5 is not possible. That is why the pressure pipe is fastened to the functional/connection unit on the flanged rim of the pressure pipe (25). The flanged rim of the modular pipe is accommodated by means of a split flange clamp (24) and clamped with the functional/connection unit.

The upper side of the flange clamp (24) is here positioned in a holding groove (26) of the functional/connection unit (11).

The flange clamp (24) may here be made up of two semicircles or a plurality of circular segments. It may however also consist of a clamp with one-sided screw fitting. The side located on the functional/connection unit in the holding groove (26) has a larger support area than the area on the flanged rim because the functional/connection unit (11) is normally made of plastics and does therefore not exhibit the same strength as the metallic pressure pipe.

To make the flange clamp cheaper, it is possible to bend the clamp from a U-shaped sheet-metal material in a circular form. In this case the holding groove 26 is dispensed with.

At high pressures the flange 25 tends to bend open. That is why the flange beaded outwards at an angle relative to the modular pipe may be equipped with an additional angular beading in alignment with the modular pipe. This Z-shape, as viewed from the modular pipe wall, stiffens the flange. In this case the connection between modular pipe 4 and functional/connection unit 11 can be established by means of a flange plate with circular cut-out and connecting screws.

Liquid supply and membrane accommodation were already depicted in FIG. 5.

FIGS. 7a-e

This figure shall illustrate the function during use of a disposable pressure pipe with integrated membrane as a cheap variant.

In this case the prismatic upper part (27) can be detached from the cylindrical lower part (28) by means of a screw coupling (30). The modular pipe (4) is here undetachably fastened with weld seam (29) to the lower part (28).

The liquid supply takes place as depicted in FIG. 5. Since due to the different thread tolerances of the screw coupling (30) between upper part and lower part of the functional/connection unit (11), consisting of (27) and (28), the vertical axes of the liquid bores (3 and 6) are not in alignment with each other, a collection duct for the retentate (34) [configured as a circular ring recess of the second step of the lower part (55)] is formed by means of an undercut, and a collection duct of the supply liquid (35) [configured as a circular-ring recess of the first step of the lower part (54)] is formed by means of an undercut.

To improve the retentate outflow (6) and to increase the flow cross-sections in the retentate outflow duct (34), an additional retentate outflow duct (36) may be added in the upper part (27) or used as the sole outflow duct.

To improve the distribution of liquid and to increase the flow cross-sections of the supply liquid, an additional flow duct (37) may be added to the flow duct (35) in the upper part (27) or used as the sole flow duct.

The sealing relative to the individual liquid ducts is carried out with sealing elements (31/32/33). Depending on the number of outflow and inflow ducts, the upper part (27) is three-stepped (54/55/56) or five-stepped (54/55/56/57/58).

FIG. 7c

This figure shows the schematic illustrations of 7 in a perspective way.

FIG. 8

This figure shows the simple possibility of an extension to obtain a filter system of a parallel type with standardized components and low manufacturing costs.

Starting from FIG. 7, but also applicable to FIGS. 5 and 6, said illustration is a perspective view showing the parallel-aligned interconnection of the functional/connection units (11); in this case the prismatic upper part (27). The neighboring functional/connection units are here plugged together by means of connecting plug-in nipples (42). The connecting plug-in nipples (42) are provided on the circumference with sealing elements (53) which can be inserted as one or several elements in successive order into the groove (47). The locks (43) are inserted into the groove (46) via the openings for accommodating the lock (41) of the functional/connection units. The accommodating bores (3/7/6) can simultaneously be mounted on all sides of the prismatic upper part so as to permit a parallel or serial connection, thereby achieving an increase in the filtrate capacity.

Figure 3:
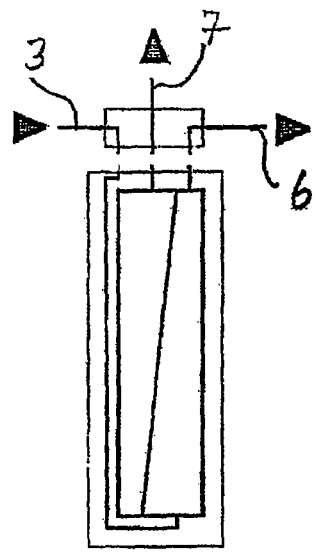
Figure 3A:
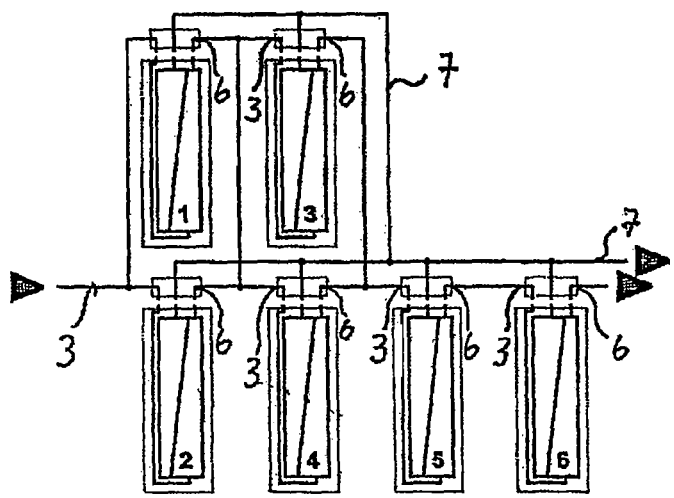
Figure 3B:
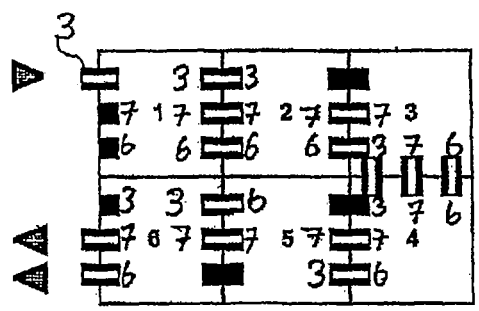

With a parallel configuration the flow ducts 3, 6, 7 are interconnected by means of plug-in nipples 42, as shown. Due to different demands made on the permeate quality, the efficiency of the whole system, or also the quality of the inflowing liquid, a serial connection or the combination of parallel and serial connection of the filter elements should be envisaged, as can be seen in FIG. 3.

The functional/connection units are provided with the connections 3, 6, 7 on one side, or also several sides, which are constructionally advantageous for the interconnection.

It should be noted that the present invention is not restricted to the above-described and illustrated embodiments. Rather, all of the disclosed features can be combined in any way individually with one another.

1. Feed container
2. High-pressure pump
3. Connection: liquid supply
4. Pressure pipe
5. Membrane
6. Connection: outflowing retentate
7. Connection: filtrate
8. Sealing lips of the membrane
9. Reject valve: retentate
10. Conductivity measurement: filtrate
11. Functional/connection unit
12. Prismatic upper part of the functional/connection unit
13. Outlet bore with surrounding annular gap of the inflowing liquid
14. Front bore of the outflowing retentate
15. Accommodating bore of the permeate collection pipe (filtrate discharge)
16. Cylindrical lower part of the functional/connection unit
17. Accommodating cylinder of the membrane with liquid ducts on the outside for uniform distribution of the liquid supply into the annular gap between membrane and pressure pipe inside and membrane stop on the inside
18. Sealing of the screwed modular pipe
19. External thread for accommodating the screwed modular pipe
20. Seal of the permeate collection pipe
21. Annular gap between membrane and pressure pipe inside
22. Liquid supply into the membrane
23. Internal thread of the modular pipe for fastening to the functional/connection unit
24. Split flange clamp for fastening the flanged modular pipe to the functional/connection unit. The individual segments of the flange clamp are to be connected.
25. Modular pipe flange
26. Holding groove of the flange clamp in the functional/connection unit
27. Separate prismatic upper part of the bipartite functional/connection unit
28. Separate cylindrical lower part of the bipartite functional/connection unit
29. Weld seam of the undetachable modular pipe
30. Screw coupling between upper part and lower part of the functional/connection unit
31. Annular sealing: filtrate outlet
32. Annular sealing: retentate outlet
33. Annular sealing: liquid supply
34. Collection duct of the retentate, configured as a circular ring recess of the $2^{nd}$ step of the lower part 35. Collection duct of the supply liquid, configured as a circular ring recess of the $1^{st}$ step of the lower part
36. Collection duct of the retentate, configured as the $3^{rd}$ step in the upper part
37. Collection duct of the supply liquid, configured as the $1^{st}$ step in the upper part
38. Sealing ring of the flanged modular pipe
39. Release valve: filtrate
40. Lower part of the modular pipe
41. Opening for accommodating the locks
42. Connecting plug-in nipple with sealing elements
43. Locks
44. Permeate collection pipe
45. Retentate exit from the membrane
46. Plug-in nipple: holding groove for lock
47. Plug-in nipple: groove for sealing element
48. Lid for modular pipe
49. Lid for modular pipe
50. Liquid ducts
51. Webs
52. Membrane stop
53. Sealing element for plug-in nipple
54. Step 1
55. Step 2
56. Step 3
57. Step 4
58. Step 5

The invention claimed is:

1. A filter module comprising a pressure pipe and a membrane disposed therein, having connections for a fluid to be fed, and for filtrate and retentate to be discharged,
wherein a functional and connection unit is fastened to an end of the pressure pipe and has an upper part and a cylindrical lower part,
wherein the fluid feed, filtrate discharge, and retentate discharge connections are further provided on the upper part and flow ducts in communication with the fluid feed, filtrate discharge, and retentate discharge connections pass through the cylindrical lower part, wherein the retentate discharge connection is horizontal and has an outlet on a side of the upper part, wherein the pressure pipe and the membrane have provided thereinbetween an open annular space and wherein the pressure pipe has a bottom, wherein the fluid feed duct terminates in a surrounding annular gap in the cylindrical lower part, the surrounding annular gap comprising an annular groove cut into an outer surface of the cylindrical lower part and extending inwardly from the edge of the outer surface of the cylindrical lower part and extending from the fluid feed duct to the edge of the outer surface of the cylindrical lower part, the annular groove being horizontal and perpendicular to the fluid feed duct, wherein fluid flows from the fluid feed duct though the surrounding annular gap and into the annular space, and wherein the retentate flow duct comprises an annular duct exiting the membrane, the annular duct connected to a single vertical duct perpendicular to and in communication with the horizontal retentate discharge connection.

2. The filter module according to claim 1, wherein the functional and connection unit is fastened to an upper end of the pressure pipe.

3. The filter module according to claim 1, wherein the functional and connection unit is fastened to a lower end of the pressure pipe.

4. The filter module according to claim 1, wherein the upper part has a shape of a prism, and that in at least one of the side faces of the prism the fluid feed, filtrate discharge, and retentate discharge connections for the fluid are provided.

5. The filter module according to claim 4, wherein in a plurality of side faces of the prism the fluid feed, filtrate discharge, and retentate discharge connections are respectively provided, so that two or more functional and connection units are interconnectable to form a filter system, the side faces thereof being positioned in parallel with one another.

6. The filter module according to claim 1, wherein the upper part has a shape of a prism and that two connections are provided in at least one side face of the prism, and the connections on another side face, so that two or more functional and connection units are interconnectable to form a filter system, the side faces thereof being positioned in parallel with one another.

7. The filter module according to claim 1, wherein neighboring functional and connection units are connectable by means of plug-in nipples.

8. The filter module according to claim 7, wherein the plug-in nipples are lockable.

9. The filter module according to claim 1, the lower part being cylindrical and comprising a connection for the pressure pipe and a connection for the membrane such that the supplied fluid is introduced between the membrane and the inner wall of the pressure pipe.

10. The filter module according to claim 1, wherein the functional and connection unit further comprises feed and discharge connections serving to connect the system to external devices, to sample or inject media, which are disposed on the side faces or the front face of the upper part.

11. The filter module according to claim 1, wherein the functional and connection unit comprises additional accommodating connections for measurement and control devices, including sensors, for measuring state variables, throughputs and substance properties and/or devices for varying the gas or liquid flows in the sense of a release, acceleration, shutting-off, throttling or switching-over.

12. The filter module according to claim 1, wherein the pressure pipe comprises a flange and is fastened by means of clamps to the lower part of the functional and connection unit.

13. The filter module according to claim 1, wherein the pressure pipe has a thread and is fastened by means of a screw coupling to the lower part of the functional and connection unit.

14. The filter module according to claim 1, wherein the upper part and the lower part of the functional and connection unit are detachably fastened to each other by means of screw coupling.

15. The filter module according to claim 14, wherein the pressure pipe and the membrane are undetachably connected to the lower part to be screwed in.

16. The filter module according to claim 14, wherein the upper part of the functional and connection unit has a centric three-step bore for accommodating the lower part to be screwed in, the inside of the outermost step connected to the vertical portion of the middle step, and the inside of the middle step connected to the vertical portion of the innermost step, and that the outermost step of the three-step bore is a trapezoidal thread for accommodating the lower part.

17. The filter module according to claim 14, wherein the lower part of the functional and connection unit which is adapted to be screwed in has a three-step, centrically arranged pipe connection, the inside of the outermost step connected to the vertical portion of the middle step, and the inside of the middle step connected to the vertical portion of the innermost step, and that the outermost step of the three-step pipe connection has a trapezoidal thread for connection to the upper part.

18. The filter module according to claim 16, wherein the three-step pipe connection of the screw-in lower part of the functional and connection unit has a sterile tear-off closure cap.

19. The filter module according to claim 1, wherein the bottom of the pressure pipe which is opposite to the functional and connection unit is openable.

20. The filter module according to claim 3, wherein the bottom of the pressure pipe which is opposite to the functional and connection unit is openable and contains the permeate exit.

21. The filter module according to claim 1, wherein the fluid is untreated water.

22. A filter module comprising a pressure pipe and a membrane disposed therein, having connections for a fluid to be fed, and for filtrate and retentate to be discharged,
wherein a functional and connection unit is fastened to an end of the pressure pipe and has an upper part and a cylindrical part,
wherein the fluid feed, filtrate discharge, and retentate discharge connections are further provided on the upper part and flow ducts in communication with the fluid feed, filtrate discharge, and retentate discharge connections pass through the cylindrical lower part, wherein the retentate discharge connection is horizontal and has an outlet on a side of the upper part, wherein the pressure pipe and the membrane have provided thereinbetween an open annular space and wherein the pressure pipe has a bottom, wherein the fluid feed duct terminates in a surrounding annular gap in the cylindrical lower part, the surrounding annular gap comprising an annular groove cut into an outer surface of the cylindrical lower part and extending inwardly from an edge of the outer surface of the cylindrical lower part and extending from the fluid feed duct to the edge of the outer surface of the cylindrical lower part, the annular groove being horizontal and perpendicular to the fluid feed duct, wherein the fluid flows from the fluid feed duct through the surrounding annular gap and liquid ducts and webs on an outside of a cylinder accommodating the membrane, and into the annular space, and wherein the retentate flow duct comprises an annular duct exiting the membrane, the annular duct connected to a single vertical duct perpendicular to and in communication with the horizontal retentate discharge connection.

* * * * *